V. A. REILLY.
WHEEL BOXING.
APPLICATION FILED MAY 26, 1917.

1,290,353.

Patented Jan. 7, 1919.

WITNESSES
Chas. E. Kemper.
J. O'Connell

INVENTOR
Vincent A. Reilly.

BY Richard B. Owen,

ATTORNEY

UNITED STATES PATENT OFFICE.

VINCENT A. REILLY, OF AITKIN, MINNESOTA.

WHEEL-BOXING.

1,290,353.  Specification of Letters Patent.  Patented Jan. 7, 1919.

Application filed May 26, 1917. Serial No. 171,289.

*To all whom it may concern:*

Be it known that I, VINCENT A. REILLY, a citizen of the United States, residing at Aitkin, in the county of Aitkin and State of Minnesota, have invented certain new and useful Improvements in Wheel-Boxings, of which the following is a specification.

This invention relates to certain new and useful improvements in wheel hub attaching devices.

The primary object of the invention is to provide a hub cap or attaching device which can be readily placed upon an axle and secured to a wheel hub, and will effectively prevent the entrance between said axle and hub of all dirt, sand and other like gritty matter.

The above and other objects as well as the exact construction, arrangement and combination of the several parts of my invention will be more readily understood from the following description and accompanying drawings in which drawings, Figure 1 is a side elevation view of my device.

Figure 1:
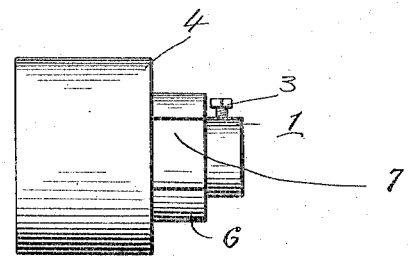
Figure 2:
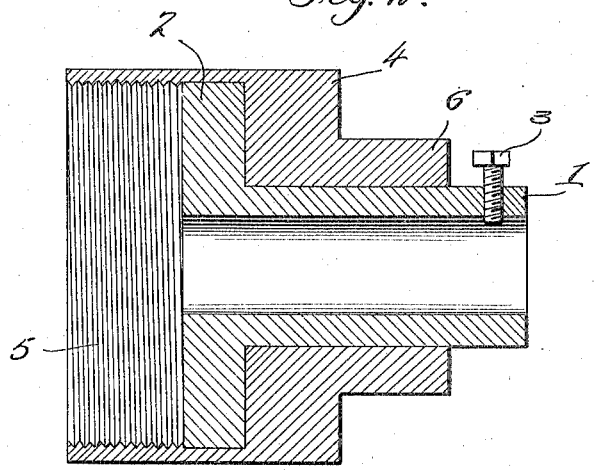
Fig. 2 is a longitudinal section taken centrally through the same.
Figure 3:
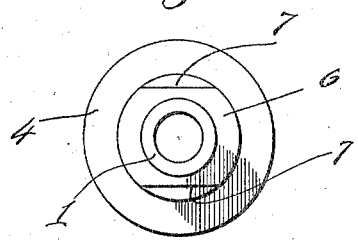
Fig. 3 is an end view.

In the different figures of the drawings, illustrating the preferred embodiment of my invention the numeral 1 designates an axle engaging sleeve which is provided at one end with an annular flange 2. Passing through a threaded opening formed in the sleeve 1 adjacent the opposite end thereof is a set screw 3 the purpose of which will be hereinafter explained. Rotatably mounted on the sleeve 1 is a hub cap 4 which abuts and partially incloses the flanged end of the sleeve and is interiorly threaded as at 5. Formed integral with the cap 4 and also encircling the sleeve 1 is a collar 6 which is flattened at diametrically opposite points as indicated at 7.

In applying my device to a wheel and axle (not shown) the sleeve 1 carrying the hub cap 4 is placed upon the axle. The hub cap 4 is then threaded upon the hub of the wheel a sufficient distance to bring the flange 2 up against the end of the hub, but not tightly enough to interfere with the free rotation of the wheel. The set screw 3 is then threaded into engagement with the axle to hold the sleeve stationary. In this manner it will be seen that the sleeve 1 is fixed to the axle while the hub cap 4 is rotatably connected with the hub of the wheel. On bringing the flange 2 in contact with the end of the hub it will be seen that the wheel will be held against sliding movement relative to the sleeve 1. The flat surfaces 7 on the collar provide gripping surfaces for a wrench when applying or removing the collar.

In the present drawings and description I have disclosed in detail only one preferred embodiment of my invention, but I wish it to be understood that my invention is susceptible to various changes in the construction, arrangement and proportion of the several parts thereof, providing the changes contemplated come within the scope of the appended claim without departing from the spirit of the invention.

I claim:—

A hub attaching device for vehicle and other wheels, comprising a removable sleeve adapted for sliding rotary engagement with an axle, a flange on one end of said sleeve, a cap rotatably mounted on said sleeve, a tubular enlargement formed on said cap and embracing said sleeve, and a threaded fastening member passing through the sleeve opposite the flange end thereof, and serving as a stop adapted to engage said tubular enlargement.

In testimony whereof I affix my signature in presence of two witnesses.

VINCENT A. REILLY.

Witnesses:
C. P. BENGTSON,
J. C. GALAMEAULT.

Copies of this patent may be obtained for five cents each, by addressing the "Commissioner of Patents, Washington, D. C."